(12) United States Patent
Yin

(10) Patent No.: US 11,169,388 B2
(45) Date of Patent: Nov. 9, 2021

(54) LASER BEAM COMBINING APPARATUS AND METHOD

(71) Applicant: The Penn State Research Foundation, University Park, PA (US)

(72) Inventor: Shizhuo Yin, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 196 days.

(21) Appl. No.: 16/467,211

(22) PCT Filed: Aug. 21, 2017

(86) PCT No.: PCT/US2017/047724
§ 371 (c)(1),
(2) Date: Jun. 6, 2019

(87) PCT Pub. No.: WO2018/106295
PCT Pub. Date: Jun. 14, 2018

(65) Prior Publication Data
US 2020/0089013 A1    Mar. 19, 2020

Related U.S. Application Data

(60) Provisional application No. 62/431,567, filed on Dec. 8, 2016.

(51) Int. Cl.
*H04J 14/08* (2006.01)
*G02B 27/14* (2006.01)
(Continued)

(52) U.S. Cl.
CPC ............ *G02B 27/14* (2013.01); *H01S 3/0071* (2013.01); *H04Q 11/0005* (2013.01);
(Continued)

(58) Field of Classification Search
CPC ....................................................... H04J 14/08
See application file for complete search history.

(56) References Cited

U.S. PATENT DOCUMENTS 5,808,772 A    9/1998  Yamaguchi et al.
6,212,310 B1 *  4/2001  Waarts ............... G02B 6/29319
                                                372/43.01
(Continued)

FOREIGN PATENT DOCUMENTS

WO    2004044882 A1    5/2004
WO    2012136434 A2    10/2012

OTHER PUBLICATIONS

Sasaki et al., "Microsecond optical switching of five channels by KTN electro-optic deflector", Electronics Letters, vol. 50, No. 21, Oct. 2014 (Year: 2014).*
(Continued)

*Primary Examiner* — Shi K Li
(74) *Attorney, Agent, or Firm* — Buchanan Ingersoll & Rooney PC

(57) ABSTRACT

A laser beam apparatus can include a set of pulsed lasers (e.g. solid state fiber lasers), a controllable beam deflector, and an electric power supply and controller connected to the beam deflector. The laser pulses from the different pulsed lasers can be configured to hit the beam deflector at different angles and different times. The electric power supply and controller can be configured to control and synchronize the timing and angle at which the different lasers pulses hit the beam deflector with an adjustment of the deflection property of the beam deflector so that the laser pulses from different input directions propagate in the same direction after passing through the beam deflector. The laser pulses from the lasers can be combined together via this control and synchronization.

20 Claims, 5 Drawing Sheets

(51) Int. Cl.
*H01S 3/00* (2006.01)
*H04Q 11/00* (2006.01)

(52) U.S. Cl.
CPC ............ *H04Q 2011/0033* (2013.01); *H04Q 2011/0039* (2013.01); *H04Q 2011/0041* (2013.01)

(56) References Cited

U.S. PATENT DOCUMENTS

2013/0147891 A1    6/2013  Koga
2019/0096630 A1*  3/2019  Kruit .................... H01J 37/226

OTHER PUBLICATIONS

Römer et al., "Electro-optic and acousto-optic laser beam scanners", Physics Procedia, 2014 (Year: 2014).*
Chen, H., Optical Beam Scanning Using Potassium Tantalate Niobate,Thesis submitted to the University of Dayton, Dec. 2015, pp. 1,12-13, 15-16 and 24.
International Search Report and Written Opinion for PCT/US2017/047724 filed Aug. 21, 2017, dated Jun. 21, 2018.

* cited by examiner

LASER BEAM COMBINING APPARATUS AND METHOD

CROSS-REFERENCE TO RELATED APPLICATION

This patent application is the U.S. national stage application under 35 U.S.C. § 371 for International Patent Application No. PCT/US 2017/047724, filed on Aug. 21, 2017, which claims priority to U.S. Provisional Patent Application No. 62/431,567, which was filed on Dec. 8, 2016, the entire contents of each being incorporated herein by reference in its entirety.

FIELD OF THE INVENTION

The present innovation relates to lasers, laser beam combining, methods of using lasers and methods for combining laser beams.

BACKGROUND OF THE INVENTION

Laser beam modulation and detection can be useful for a variety of applications. Potassium tantalate-niobate (KTN) crystals are considered to have a large electro-optic (EO) effect and a variety of methods have been proposed to improve electric-controllable light beam modulation and deflection based on use of a KTN crystal. Examples of such methods can be appreciated from Chinese Patent Publication Nos. CN 101864598A, 102692734B, and CN104076573A. Other laser beam modulation and/or detection methodologies that have been developed can be appreciated from U.S. Pat. App. Pub. No. 2006/0062514 and U.S. Pat. No. 6,473,246. Such approaches have often failed to harness a laser beam combining approach that can permit the beam to be precisely controlled and synchronized.

SUMMARY OF THE INVENTION

Embodiments of my laser combining apparatus and multiplexing method for laser beam combining can be configured to permit combining a large number of laser beams from an array of pulsed lasers via a beam deflector (e.g. a KTN beam deflector). The timing and angle of the beam deflector can be precisely controlled and synchronized with the incident angle and incident timing of laser pulses for an array of pulsed lasers. The combining of such laser beams can be multiplexed via use of time-division-multiplexing (TDM). Embodiments of my method and apparatus can permit a high multiplexing capacity, a high beam quality, a high robustness (e.g. the combined beam formed from an array of pulsed lasers in some embodiments of my apparatus and method can be robust and be insensitive to the phase fluctuations of individual pulsed lasers and other components in the beam combining system). They can be feasibly and economically designed to have a small footprint, and can provide high optical energy efficiency beam combining (e.g. some embodiments of my beam combining technique and apparatus can be configured to have a negligible power loss and provide an overall optical energy efficiency that is over 99%).

In some embodiments, my laser combining apparatus includes an array of lasers, each of the lasers configured to transmit laser pulses and a potassium tantalate-niobate (KTN) beam deflector positioned to receive the laser pulses from the lasers of the array of lasers such that the laser pulses pass through the KTN beam deflector to form a combined laser beam. An electric power supply and controller can be connected to the KTN beam deflector to adjust deflection properties of the KTN beam deflector.

In some embodiments, the electric power supply and controller is configured control timing of the laser pulses from the lasers of the array of lasers and is configured to adjust the deflection properties of the KTN beam deflector to synchronize timing and incident angle of the laser pulses with the deflection properties of the KTN beam deflector so that a propagation direction of the laser pulses after passing through a deflector body of the KTN beam deflector are the same regardless of an incident angle and/or incident direction at which the laser pulses hit a front surface of the deflector body of the KTN beam deflector. The KTN beam deflector can have an aperture through which the laser pulses pass for being passed into the deflector body of the KTN beam deflector. The lasers can be spaced apart from each other and each have a respective incident angle at which the laser pulses from the laser are passed into the deflector body of the KTN beam deflector.

In some embodiments, the electric power supply and controller comprises a switchable capacitor voltage divider. The switchable capacitor voltage divider can be configured to adjust between different positions where each of the positions is assigned to a respective one of the lasers of the array of lasers for sending a unique voltage to the KTN beam deflector at the time a laser pulse from that laser hits a front face of the deflector body of the KTN beam deflector to adjust the deflection properties of the KTN beam deflector so that the laser pulse is passed through the deflector body to form the combined laser beam. Each unique voltage can be set so that there is a different voltage for each of the lasers of the array of lasers.

The electric power supply and controller can include a number of elements. For instance, the electric power supply and controller can include a voltage source, a plurality of capacitors, a plurality of resistors, and a plurality of electric switches connected to the capacitors. The electric switches can be arranged such that each switch is adjustable from OFF positions to ON positions so that only one switch of the switches is in an ON position at any time. Each switch can be assigned to a respective laser of the array of lasers so that each switch is moved to its ON position when a laser pulse from the laser assigned to that switch is to hit a front face of a deflector body of the KTN beam deflector. In some embodiments, the switches can be arranged and configured such that the switches are moveable to ON and OFF positions for defining different voltage amounts to be fed to the KTN beam deflector, each different voltage amount being assigned to a respective one of the lasers of the array of lasers. The switches can be configured to be moved so that a unique voltage assigned to a respective laser of the array of lasers is fed to the KTN beam deflector when a laser pulse from that laser is to hit a front face of a deflector body of the KTN beam deflector.

In some embodiments, the KTN beam deflector has a deflection speed<=1 microsecond, a deflection angle>=0.01 deg, and the area of aperture>=1 mm$^2$. In other embodiments, the KTN beam deflector may have other properties that differ form these.

A method of combing lasers pulses from different lasers for forming a combined laser beam is also provided. Embodiments of the method can include controlling lasers so that each laser sends a laser pulse toward a beam deflector to hit a front face of a deflector body of the beam deflector so that all laser pulses from the lasers hit the front face at a different time, where each of the lasers send the laser pulse of that laser to the beam deflector at a different incident angle and adjusting a deflection property of the beam deflector to synchronize timing and incident angle at which lasers pulses from the lasers hit the beam deflector so that the laser pulses from the lasers propagate in a same direction after passing through the beam deflector.

For the method, the beam deflector may be a potassium tantalate-niobate (KTN) beam deflector or other type of beam deflector such as, for example, a lithium niobate (LiNbO$_3$) based beam deflector, a lead magnesium niobate-lead titanate (PMN-PT) based beam deflector, a lanthanum-modified lead zironate titanate (PLZT) based beam deflector, a barium titanate (BaTiO$_3$) based beam deflector, or a strontium-barium niobate (SBN) based beam deflector, a microelectromechanical system (MEMS) based beam deflector, a nanoelectrormechanical system (NEMS) based beam deflector, or an acousto-optic (AO) based beam deflector.

In some embodiments of my method, the adjusting of the deflection property of the beam deflector can include assigning a different voltage to be fed to the beam deflector for each laser of the laser array to account for the incident angle of that laser and applying the assigned voltage to the beam deflector for the laser pulse from that laser to which the different voltage is assigned when that laser pulse hits the beam deflector. In other embodiments, the adjusting of the deflection property of the beam deflector can include adjusting positions of at least one switch of an electric power supply and controller connected to the KTN beam deflector.

The electric power supply and controller utilized in embodiments of my method can have any number of configurations and structures. In some embodiments, the electric power supply and controller can include a voltage source, a plurality of capacitors, a plurality of resistors, and a plurality of electric switches connected to the capacitors. The switches can be arranged such that each switch is adjustable from an OFF position to an ON position so that only one switch of the switches is in an ON position at any time, each switch being assigned to a respective laser of the array of lasers so that each switch is moved to its ON position when a laser pulse from the laser assigned to that switch is to hit a front face of a deflector body of the beam deflector. In other embodiments, the switches can be arranged and configured such that the switches are moveable between ON and OFF positions for defining different voltage amounts to be fed to the beam deflector where each different voltage amount is assigned to a respective one of the lasers of the array of lasers and the switches are configured to be moved so that a unique voltage assigned to a respective laser of the array of lasers is fed to the beam deflector when a laser pulse from that laser is to hit a front face of a deflector body of the beam deflector. In yet other embodiment of the method, the electric power supply and controller can be configured as or can include a switchable capacitor voltage divider, a switchable resistant voltage divider circuit, a high voltage pulsed voltage source, an arbitrary form voltage generator, a high voltage and high speed voltage amplifier, or combinations thereof.

In some embodiments of my method, a switchable capacitor voltage divider can be the electric power supply and controller and can be configured to adjust between different positions where each of the positions is assigned to a respective one of the lasers of the array of lasers for sending a unique voltage to the beam deflector at the time a laser pulse from that laser hits a front face of the deflector body of the beam deflector to adjust the deflection properties of the beam deflector so that the laser pulse is passed through the deflector body to form the combined laser beam. The unique voltage can set so that each of the lasers of the array of lasers has a different voltage.

I also provide a laser combining apparatus that includes a beam deflector positioned to receive laser pulses from lasers of an array of lasers such that the laser pulses pass through the beam deflector to form a combined laser beam, each of the lasers transmitting at least one laser pulse to the beam deflector at an incident angle and at a time that is different from the incident angle and time at which the laser pulses from the other lasers of the laser array send laser pulses and a controller connected to the beam deflector that is configured to adjust deflection properties of the beam deflector to form the combined laser beam. The controller can be configured to synchronize the timing and the incident angle at which lasers pulses from the lasers hit the beam deflector with the adjustment of the deflection properties of the beam deflector so that the laser pulses from the lasers propagate in the same direction after passing through the beam deflector.

In some embodiments of the laser combining apparatus, the beam deflector can be based on space-charged-controlled beam deflection, temperature-gradient-controlled beam deflection, the composition-gradient-controlled beam deflection, or geometric (e.g., prism)-shape-controlled beam deflection, or their combinations. The beam deflector can be a KTN based beam deflector or other type of electro-optic crystal or ceramic material based beam deflector such as lithium niobate (LiNbO$_3$) beam deflector, lead magnesium niobate-lead titanate (PMN-PT) beam deflector, lanthanum-modified lead zironate titanate (PLZT) beam deflector, barium titanate (BaTiO$_3$) beam deflector, or strontium-barium niobate (SBN) beam deflector. In yet other embodiments the beam deflector can be configured as a microelectromechanical system (MEMS) deflector, a nanoelectrormechanical system (NEMS) deflector, or an acousto-optic (AO) deflector.

In some embodiments of my method, time division multiplexing beam combining can be performed such that the multiplexing has a one-dimensional or a two-dimensional architecture. It should be appreciated that some embodiments of my laser beam combining apparatus can be configured to facilitate such time division multiplexing beam combining. Further, embodiments of my method and in embodiments of my laser combining apparatus can be configured so that the laser pulses from lasers of a laser array can be evenly spaced apart or unevenly spaced apart.

Other details, objects, and advantages of the invention will become apparent as the following description of certain present preferred embodiments thereof and certain present preferred methods of practicing the same proceeds.

BRIEF DESCRIPTION OF THE DRAWINGS

Exemplary embodiments of my laser beam apparatus, and methods of making and using the same are shown in the accompanying drawings. It should be appreciated that like reference numbers used in the drawings may identify like components.

DETAILED DESCRIPTION OF PRESENT PREFERRED EMBODIMENTS

Conventional beam combining methods, including both coherent beam combining and incoherent beam combing approaches, suffer from severe limitations. For example, the coherent beam combining method needs precise phase control of the individual lasers that it is extremely difficult to combine a large number of laser elements (e.g., greater than 100 lasers, greater than 500 lasers, etc.) together to achieve a robust and stable operation because of the phase fluctuations of individual laser element and beam combining devices. As another example, the number of beam combining channels for the incoherent spectral beam combining approach is typically limited by the spectral bandwidth of the transmission window of the atmosphere (e.g., 50 nm).

Figure 1:
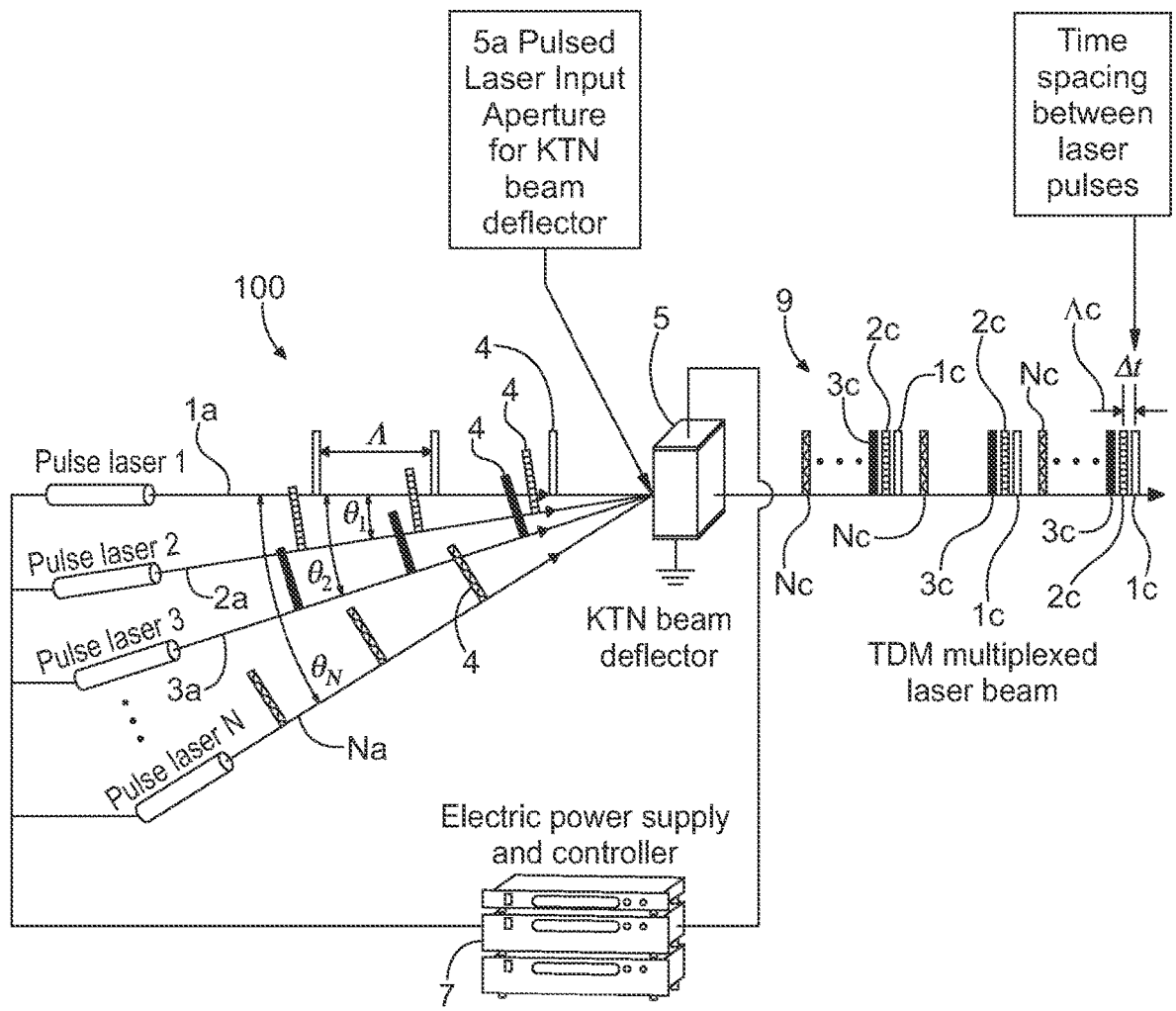
FIG. 1 is a schematic illustration of a first exemplary embodiment of a laser beam apparatus configured to provide one dimensional (1D) TDM based laser beam combining.
Figure 2:
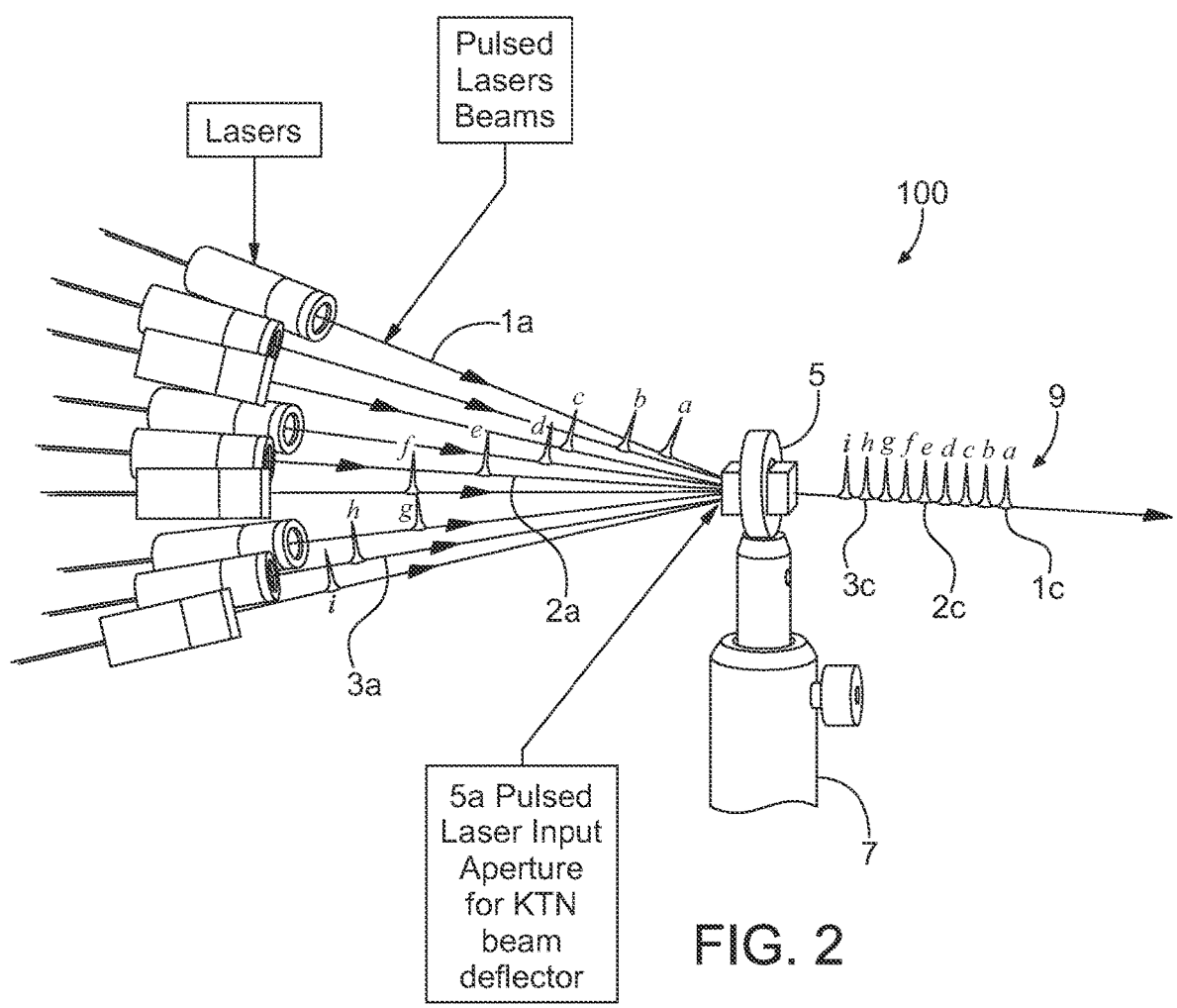
FIG. 2 is a schematic illustration of a second exemplary embodiment of a laser beam apparatus configured to provide two-dimensional (2D) TDM based laser beam combining.

I have developed a new laser beam combining methodology that permits multiplexing of laser beams by use of a time-division-multiplexing (TDM) approach utilized in connection with a beam deflector mechanism. Embodiments of this approach can include (1) a set of pulsed solid state lasers (e.g. solid state fiber lasers, other types of solid state lasers, etc.), (2) a one-dimensional (1D) and/or two-dimensional (2D) electric-controllable beam deflector 5, and (3) an electric-power supply and controller 7 connected to the beam deflector 5. There may be a large number of lasers in the set of pulsed lasers (e.g. 10 lasers, 100 lasers, 500 lasers, 800 lasers, 1,000 lasers, 100-1,000 lasers, 500 to 1,500 lasers, more than 1,000 lasers, etc.). Lasers 1, 2, 3, N are shown in FIGS. 1 and 2 to be representative of the large number of lasers that may be utilized in embodiments of the laser combining apparatus 100. The beam deflector 5 can be configured as a high speed potassium tantalate-niobate (KTN) beam deflector or can be configured as another type of beam deflector 5. For example, the beam deflector 5 can be configured as a lithium niobate ($LiNbO_3$) based beam deflector, a lead magnesium niobate-lead titanate (PMN-PT) based beam deflector, a lanthanum-modified lead zironate titanate (PLZT) based beam deflector, a barium titanate ($BaTiO_3$) based beam deflector, or a strontium-barium niobate (SBN) based beam deflector. As another example, the beam deflector 5 can be configured as a microelectromechanical system (MEMS) based beam deflector, a nanoelectromechanical system (NEMS) based beam deflector, or an acousto-optic (AO) based beam deflector.

Laser pulses 4 from different pulsed lasers 1, 2, 3, N can be configured to hit the beam deflector 5 at different angles θ (also referred to as incident angles) at different times. The timing and angle of the beam deflector 5 can be precisely controlled and synchronized with the incident angle θ and incident time of the laser pulses 4 for the array of pulsed lasers 1, 2, 3, N so that the laser pulses 1a, 2a, 3a, Na of the different lasers that hit the beam deflector 5 from different input directions (e.g. different incident angles at different times) propagate in the same direction after passing through the beam deflector 5 to form a combined laser beam 9, which can also be referred to as a "laser pulse train" of the pulses from the different lasers as the different pulses 4 from the lasers 1, 2, 3, N can be deflected by the beam deflector such that the deflected pulses 1c, 2c, 3c, Nc from the different lasers are arranged sequentially in the same direction to form the combined laser beam. The laser pulses from different lasers are combined together (i.e., they propagate in the same directions after passing through the beam deflector 5), which can ensure that the spatial quality of combined laser beam 9 is the same as the quality of each individual laser. The average power of combined laser beam 9 can be higher than that of the individual lasers of the laser array because the combined laser beam 9 has a higher repetition rate than that of the individual laser.

FIG. 1 illustrates an exemplary systematic configuration of a laser beam apparatus configured to utilize one-dimensional (1D) TDM based laser beam combining. Pulses from a first pulse laser 1 hit the beam deflector 5 without applying external voltage that may be supplied via the electric-power supply and controller 7 connected to the beam deflector 5. Thus, there is no deflection for the pulses 1a from the first pulse laser 1 that form pulses 1c of the combined laser beam 9. Pulses from a second pulse laser 2 are delayed by a time Δt and hit the front surface of a beam deflector 5 at an angle of $θ_1$ (e.g., ~2 milliradian (mrad)) with respect to the normal direction of a front surface of the beam deflector 5. A voltage $V_1$ that can be applied to the beam deflector 5 via the electric-power supply and controller 7 to deflect the beam from the second pulsed laser 2 hitting the beam deflector at angle $θ_1$ when pulses from second pulsed laser 2 pass through the beam deflector 5 so that the pulses 2a are deflected by an angle $θ_1$ after passing through the beam deflector 5 such that the deflected pulses of the second pulsed laser 2c propagate in the same direction as the non-deflected pulses 1c of the first pulsed laser 1 that passed through the beam deflector 5. Similarly, pulses from a third pulsed laser 3 can be delayed by a time 2Δt and hit the front surface of a deflector at an angle $θ_2$ with respect to the normal direction of the front surface of the beam deflector. A voltage $V_2$ that can deflect the third pulse 3a of the third laser 3 at an angle $θ_2$ can be simultaneously applied on the beam deflector 5 from the electric-power supply and controller 7 when pulses from the third pulsed laser 3 pass through the beam deflector 5 to deflect pulses 3c of the third laser 3 by an angle $θ_2$ so that these third pulses 3c, after passing through the beam deflector 5, propagate in the same direction as the first and second pulses 1c and 2c of the first and second lasers 1 and 2 that are passed through the beam deflector 5 to form the combined beam 9.

By repeating the above discussed process for numerous other lasers that may be in the laser array, laser pulses Na from an array of "N" laser elements can be combined together via this TDM methodology to provide a combined laser beam 9 that includes the deflected pulses Nc in the combined laser beam 9 in addition to the deflected pulses 2c and 3c and the non-deflected pulses 1c from the first laser 1 so that the pulses that pass through the beam deflector 5 and are propagated therefrom are synchronously arranged within the combined beam 9 and propagate out of the beam deflector 5 (e.g. are emitted from the beam deflector after deflecting the laser beam pulses passing through the deflector element of the beam deflector 5) in the same direction as the pulses of lasers from the other lasers (e.g. second, and third deflected pulses 2c, 3c from the second and third pulsed lasers 2, and 3 and undeflected pulses 1c from the first laser 1).

FIG. 2 illustrates another embodiment of my laser beam apparatus that is configured for two-dimensional (2D) TDM based laser beam combining. As can be appreciated from the above, the beam deflector 5 can be controlled via the different voltages applied to the beam deflector via the electric-power supply and controller 7 so that different pulses from different lasers that pass through the deflector element of the beam deflector 5 are selectively deflected so that the different pulses 1a, 2a, 3a, are propagated in the same direction in a synchronous way to form a combined laser beam 9 that is formed as a train of the pulses 1c, 2c, 3c of the lasers that propagate from the beam deflector 5 after having been passed through the beam deflector 5 while the beam deflector has a particular voltage applied to it via the electric-power supply and controller 7.

Each pulsed laser's pulses 4 can be sent to the beam deflector 5 along a separate channel of transmission, or TDM channel, which has its own respective incident angle to the beam deflector 5. The number of TDM channels that are to be fed to the beam deflector 5 to be deflected to make up the combined laser beam 9 can be determined by the divergence angle of each individual pulsed laser at a given aperture 5a of the beam deflector $\theta_{i-L}$, and the deflection range of a beam deflector, $\theta_{KTN}$.

For the 1D TDM, the number of TDM channels, $N_{1D}$, for a beam deflector is given by $$N_{1D} = \frac{\theta_{KTN}}{\theta_{i-L}}. \tag{1}$$

For the 2D TDM, if it is assumed that the divergence angle and the deflection range of a beam deflector 5 are the same for the two dimensions, the number of TDM channels, $N_{2D}$, is given by $$N_{2D} = \left(\frac{\theta_{KTN}}{\theta_{i-L}}\right)^2. \tag{2}$$

The above calculations can also be utilized for KTN beam deflectors or other types of beam deflectors. The $\theta_{KTN}$ referenced in the above calculations would be the deflection range of the beam deflector regardless of whether it is a KTN type beam deflector or other type of beam deflector.

In some embodiments, two-dimensional beam deflectors can be realized by cascading two orthogonal one-dimensional beam deflectors or a two-dimensional beam deflector can be fabricated on the same electro-optic crystals (e.g., a KTN crystal) with separate pairs of electrodes.

Figure 3:
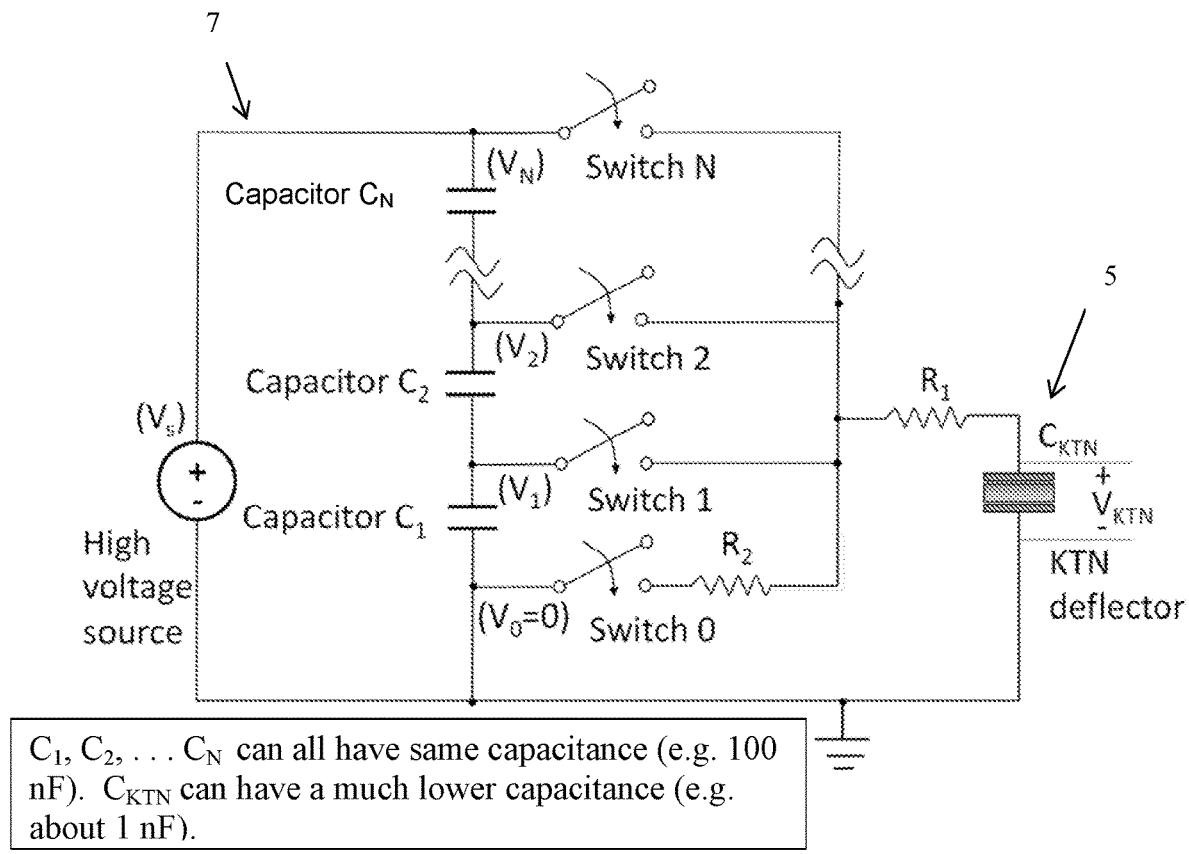
FIG. 3 is a schematic illustration of an exemplary embodiment of a power supply and controller element that is utilizable in the first and second exemplary embodiments of the laser beam apparatus. The power supply and controller element can be configured to provide a high voltage and high repetition rate power supply and controller based on a switchable capacitor voltage divider.

The electric-power supply and controller 7 can be configured to provide a high voltage, high repetition rate power supply and controller that precisely controls and synchronizes the pulsed lasers and the beam deflector 5. Embodiments of the electric-power supply and controller 7 can include a number of a switchable capacitor voltage divider, an example of which is shown in FIG. 3. The switchable capacitor voltage divider can include resistors, such as a first resistor $R_1$ and a second resistor $R_2$, a plurality of electric switches (e.g. switch 0, switch 1, switch 2, switch N, shown in FIG. 3), and a plurality of capacitors (e.g. a first capacitor $C_1$, a second capacitor $C_2$, capacitor $C_N$, etc.). The switchable capacitor voltage divider can be connected to a high voltage source. The high voltage source can be configured as a two terminal device that can maintain a pre-selected fixed voltage. The pre-selected fixed voltage may be 50 volts (V), 100 V, 200 V, 300-1,000 V, 1,000-10,000 V, or another fixed voltage that is set to meet a particular set of design criteria. Such design criteria can include, for example, the aperture 5a size of the beam deflector and the deflection range of the beam deflector. In some embodiments, the beam deflector 5 can be configured to have a deflection speed<=1 microsecond, a deflection angle>=0.01 deg, and an area of aperture 5a that is >=1 mm².

The switchable capacitor voltage divider can connect the voltage source to the beam deflector 5 to communicate or emit a voltage to the beam deflector at the time a laser pulse 4 from a particular one of the pulsed lasers is passed through the beam deflector 5 to cause the beam deflector 5 to deflect the beam to form the combined laser beam 9 and account for that laser beam's incident angle to the aperture 5a through which the beam passes into the deflector of the beam deflector 5.

As an example, each of the individual pulsed lasers of the array of lasers in the first and second embodiments can be pulsed solid state fiber lasers with following realistic specifications:
1) Pulse energy: 50 mJ/pulse;
2) Pulse duration: 60 ns;
3) Peak power: 1 MW;
4) Pulse repetition rate: 10 kHz;
5) Average power: 0.6 kW;
6) Output wavelength: 1060 nm;
7) Full beam parameter product: 30 mm×mrad.

Figure 4:
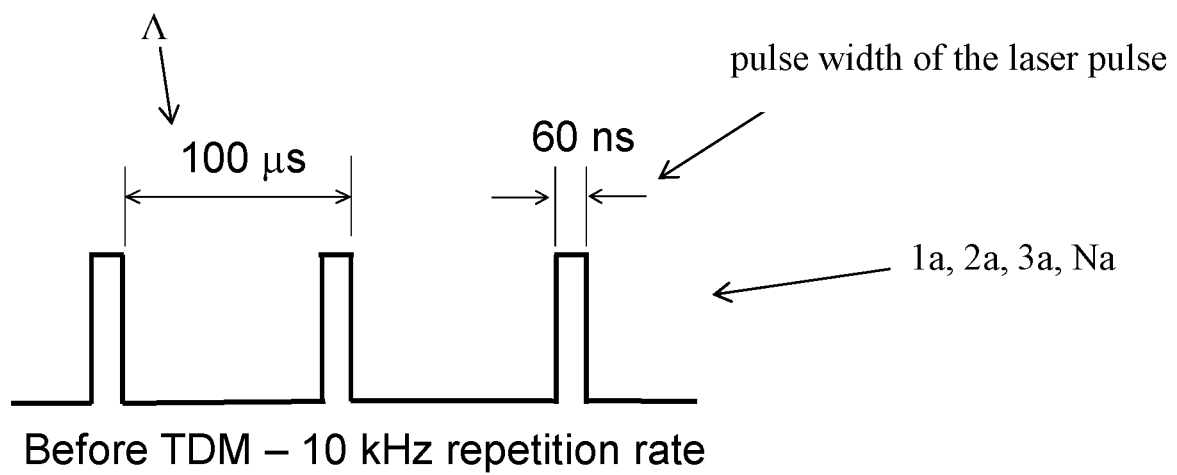
FIG. 4 is a schematic illustration of a laser pulse train that can be generated by each laser of a laser array prior to TDM beam combining that can be utilized in the first and second exemplary embodiments of the laser beam apparatuses.

FIG. 4 illustrates the pulse train of a pulsed laser with the above parameters before the TDM beam combining that occurs via the beam deflector 5 controlled via the electric-power supply and controller 7. The exemplary pulse train of FIG. 4 has laser pulses that form a pre-combination pulse train that may be generated by each laser of the array of lasers. The pulses of the exemplary pulse train shown in FIG. 4 have a pulse width of 60 ns. The frequency Λ of the pre-combined pulses (e.g. time between the start of a first pulse and the start of a second pulse) of the laser pulse train is 100 microseconds (μs) in the example of FIG. 4. For this particular set of pulsed lasers having the parameters noted above for this first example, the beam deflector 5 can be configured to have the following specifications:
1) Deflection speed: <=100 ns;
2) The range of beam deflection: 100 mrad;
3) The aperture of beam deflector: 10 mm×10 mm.

Of course, other embodiments may utilize different lasers having different specifications and the beam deflector 5 can be configured to have different specification as well. In this particular exemplary arrangement, the full beam divergence of an individual laser can be configured as 3 mrad because of a 10 mm aperture 5a that the beam deflector 5 may be configured to have for this particular exemplary embodiment. Based on Eqs. (1) and (2) set forth above, the number of TDM channels for 1D and 2D are given by:

$$N_{1D} = \frac{\theta_{KTN}}{\theta_{i-L}} = \frac{100}{3} = 33.3, \tag{3}$$

and

-continued $$N_{2D} = \left(\frac{\theta_{KTN}}{\theta_{i-L}}\right)^2 = \left(\frac{100}{3}\right)^2 \approx 1000. \quad (4)$$

Figure 5:
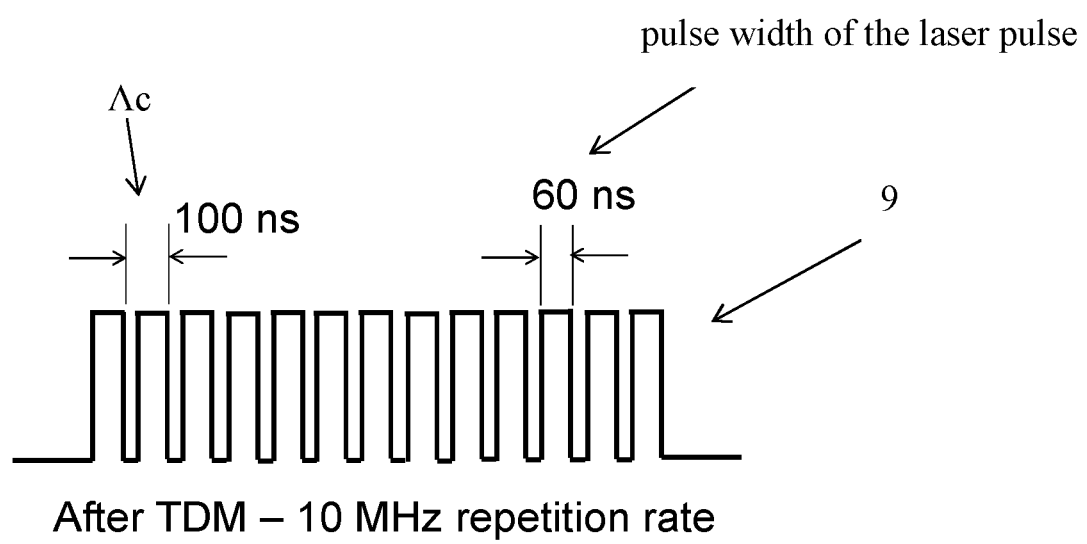
FIG. 5 is a schematic illustration of the laser pulse train of a combined laser beam 9 after the TDM beam combining that can be provided in the first and second exemplary embodiments of the laser beam apparatus.

Embodiments of the beam deflector 5 with the above specifications can be realized by operating a space-charge-controlled beam deflector 5 at the operational temperature above critical end point or by harnessing a composition gradient mechanism or temperature gradient deflection mechanism, or geometric shape controlled deflection mechanism. By harnessing the 2D TDM based laser beam combining with above exemplary parameters, a thousand pulsed fiber lasers can be combined together via TDM without sacrificing the spatial quality of the combined laser beam 9. FIG. 5 illustrates an exemplary combined pulse train of the lasers of the laser array after the laser pulses from the lasers are combined (each generating the exemplary pulse train shown in FIG. 4). The combined laser beam 9 formed via the combination of pulses that is provided via the beam deflector 5 includes laser pulses from the lasers that each have a pulse width of 60 ns as shown in FIG. 4. The frequency Λc of the combined laser beam is 100 nanoseconds (ns) for the exemplary combined laser beam 9 shown in FIG. 5. The repetition rate of the combined laser beam 9 can be 10 MHz, as illustrated in FIG. 5, which is substantially greater than each individual laser's 10 kHz repetition rate. This results in a 1000 time increase in average power from 0.6 kW to 600 kW, which is close to the peak power of the lasers of the laser array for this particular embodiment. Such a high average power (600 kW) is high enough for the applications of laser directed energy weapons and large area, high speed laser manufacturing.

As noted above and elsewhere herein, this exemplary embodiment is to provide an example configuration for the laser beam combining apparatus and methodology that can be employed when using or operating such an apparatus. It should be understood that different embodiments may utilize different numbers of lasers having different operational parameters than those noted above. The beam deflector configuration may also be adjusted to account for the different operational features of the lasers. For instance, the size and shape of the aperture 5a can be different than the 10 mm aperture noted above. The size and shape of the aperture can be any number of sizes or shapes that may allow the beam deflector 5 to meet a particular set of design criteria. For example, the size of beam deflector can be within the range of 1 mm-100 mm. The shape of the beam deflector 5 can be square, rectangular, circular, elliptic, triangular, hexagonal, polygonal, oval, or any other shape.

The two-dimensional beam deflector 5 configuration, as illustrated in FIG. 2, can be realized by cascading two orthogonal deflection direction one-dimensional beam deflectors in some embodiments. In some embodiments, a half-wave plate that matches the operational laser wavelength may be sandwiched between two one-dimensional deflectors for forming the beam deflector 5 that is utilizable for 2D beam deflection to provide for improved polarization control.

As shown in FIG. 3, which illustrates an exemplary high voltage, high repetition rate electric power supply and controller 7 that can include a switchable capacitor voltage divider, the electric power supply and controller 7 can be connected to the beam deflector 5 to affect the deflection properties of the beam deflector 5 to form the combined laser beam 9 that propagates the pulses 4 from the various different lasers in the laser array to deflect those pulses in a series of sequentially ordered and controlled pulses that define a pulsed laser train to form the combined laser beam 9. The switches of the electric power supply and controller 7 can be actuated to modify the beam deflector's operation to provide such a combined laser beam 9.

For instance, when Switch 0 is ON (i.e., connected) and all the other switches (including Switch 1, Switch 2, . . . ) are OFF (i.e., disconnected status), zero voltage can be applied on the beam deflector 5 so that there is no deflection from the first pulses 1a of the first laser 1. When Switch 1 is ON and all the other switches are OFF, a voltage $V_1$ can be applied on the beam deflector 5, which results in a deflector angle $\theta_1$ applied to second pules 2a of the second laser 2 to deflect those second pulses as deflected second pulses 2c in the combined laser beam. Similarly, when Switch N is ON and all the other switches are OFF, a voltage $V_N$ is applied on the beam deflector 5, which results in a deflector angle $\theta_N$ for deflecting the pulses of laser N for propagating those pulses in the combined laser beam sequentially within the laser pulses train that forms the combined laser beam 9. Each voltage $V_1$, $V_2$ . . . $V_N$ that is applicable via each switch being adjusted from OFF to ON and vice versa may be a different voltage to provide a different deflection property to the beam deflector 5.

In some embodiments, the switches may be configured so that only one switch is in an ON position at any one time for providing a unique voltage to the beam deflector 5 for adjusting the deflection properties of the beam deflector 5 (e.g. each voltage for each switch ON position while all other switches are in OFF position provides a unique voltage that differs from the voltage applied when any of the other switches are in an ON position and all other switches are in their OFF position). In other embodiments, the switches can be configured so that a number of different switches are in an ON position while other switches are in an OFF position in any number of unique arrangements. Each switch position for the switches may be a unique configuration to provide a desired voltage to the beam deflector for adjusting the deflection properties of the KTN beam deflector. Each switch position for the set of switches can be a respective, unique setting corresponding to deflection of laser pulses from a respective one of the lasers so that each laser has its own unique voltage setting that is passed to the beam deflector to adjust the deflection properties of the beam deflector for deflecting the laser pulses 4 for forming the combined laser beam 9. Each switch position used for each respective laser of the array of lasers can be configured so that the incident angle and timing of laser pulses 4 from the array of pulsed lasers that are to hit the front surface of the deflector body of the beam deflector 5 via the aperture 5a are precisely controlled and synchronized with the timing and deflection angle of the beam deflector so that the propagation direction of the laser pulses after passing through the deflector body of the beam deflector is the same regardless of the laser pulses' incident direction at which the laser pulses were passed into the deflector body of the beam deflector 5. The synchronization and control that be provided via actuation of the switch positions so that the voltage applied to the beam deflector via the electric power supply and controller 7 adjusts the deflection properties of the beam deflector to form the combined laser beam 9. This synchronization and control can include having the respective and unique switch position applied for providing the unique voltage to the beam deflector 5 at the time the laser pulses from the laser assigned that switch position hits the beam deflector for all the lasers of the laser array. Each laser's pulses therefore has a different level of deflection provided by the unique switch settings and voltage settings that adjust the beam deflector's deflection capacity to account for that laser's incident angle and timing at which the laser pulses pass through the deflector body of the beam deflector. The timing of the laser pulses from the different lasers is also controlled so that each laser's pulse hits the font face of the deflector body of the beam deflector 5 at its own respective time so that multiple laser pulses from different lasers do not hit the front side of the deflector body for passing through the deflector body at the same time.

The capacitance of $C_1, C_2, \ldots, C_N$, of capacitors of the electric power supply and controller 7 can be on the order of μF, which can be much larger than the capacitance of a beam deflector 5 ($C_{KTN}$ which can be on the order of nF) so that the energy stored in the capacitance of a capacitor or a set of capacitors ($C_1, C_2, C_N$, a combination of $C_1$ and $C_2$ or $C_1$ and $C_N$, etc.) can be quickly used to charge the beam deflector 5 for providing the designed deflection of a pulse from a particular laser of the laser array. Since the speed of the solid state electric switch can be very fast (~10 ns), the speed of the KTN beam deflector 5 can be mainly determined by the resistor—capacitor (RC) time constant of the circuit $\tau \approx R_{on} C_{KTN}$ (when $C_{KTN} \ll C_1, C_2, \ldots, C_N$) where $R_{on}$ is the ON state resistance (including the ON state resistant of high voltage solid state electric switch as well as the resistance of transmission wire), which can be less than 50Ω. For a size and shape configuration of the KTN beam deflector that is selected to be a 1 cm$^3$ cube beam deflector 5, the $C_{KTN} \approx 1$ nF for such an embodiment of the laser combining apparatus. The corresponding RC time constant can be ≤50 ns so that a high voltage, high repetition rate (e.g. ≥10 MHz) voltage source can be provided.

In some embodiments, after scanning the lasers of the laser array in a cycle (i.e., all the pulsed lasers have been deflected once), the lasers may be controlled so that there can be an idle time (e.g., 100 ns-1000 ns) prior to a subsequent cycle of scanning of the lasers being performed. No laser pulses hit the beam deflector 5 and there is no voltage applied on the beam deflector 5 during the idle time so that the capacitors of the electric power supply and controller 7 can be fully re-charged. Moreover, laser pulses can have uneven time spacing between pulses from the same laser and/or between when pulses from the different lasers are sent (e.g. a time between when the first and second laser's pulses hit the front surface of the deflector body of the beam deflector 5 may be a different time value than the time between when the second laser's pulse and the third laser's pulse hit the front surface of the deflector body of the beam deflector 5).

The control of the lasers may be realized by the electric power supply and controller 7 being communicatively or electrically coupled to the lasers. The control of the lasers may be alternatively controlled via a separate controller device that may communicate or synchronize its operation with the the electric power supply and controller 7.

The switchable capacitor voltage divider circuit element of the electric power supply and controller 7 is just one example of a possible design to realize high voltage, high repetition rate power supply and control device. Other types of high voltage, high repetition rate power supply and control circuits (e.g., a switchable resistant voltage divider circuit, a high voltage pulsed voltage source, an arbitrary form voltage generator, a high voltage, high speed voltage amplifier, etc.) may also be used individually or simultaneously to control the deflection angle and timing of the beam deflector 5. These other forms of voltage source may also be combined with the switchable capacitor voltage divider based voltage source.

Some embodiments of the laser combining apparatus 100 can be configured so that incident angle and timing of laser pulses 4 from the array of pulsed lasers that are to hit the front surface of the deflector body of the beam deflector via the aperture 5a are precisely controlled and synchronized with the timing and deflection angle of the beam deflector 5 so that the propagation direction of the laser pulses after passing through the deflector body of the beam deflector 5 is the same regardless of the laser pulses' incident direction at which the laser pulses were passed into the deflector body of the beam deflector 5 (e.g. the laser pulses from all the different lasers of the array of lasers are directed in the exact same direction to form the combined laser beam 9). The combined laser beam 9 formed via the timed and controlled deflection of laser pulses 4 can be combined via TDM and have the same quality as the quality of the individual laser beam pulses passed through the beam deflector 5. For instance, the spatial profile and spectral bandwidth of the combined laser beam 9 can have the same quality as the pulses of the individual lasers.

As yet another example, some embodiments of the beam deflector 5 can be based on KTN crystals and dopants that include lithium and/or transition metals. As discussed herein, other embodiments of the laser combining apparatus 100 can be configured so that the beam deflector 5 does not utilize a KTN crystal. Instead, another type of EO crystal and/or ceramic crystal may be used, such as lithium niobate (LiNbO$_3$), lead magnesium niobate-lead titanate (PMN-PT), lanthanum-modified lead zironate titanate (PLZT), barium titanate (BaTiO$_3$), or strontium-barium niobate (SBN). In yet other contemplated embodiments, the beam deflector may utilize another type of beam deflector such as a microelectromechanical system (MEMS) deflector, a nanoelectrormechanical system (NEMS) deflector, or an acousto-optic (AO) deflector.

The beam deflector 5 can be configured to provide different deflection properties to meet a particular set of design criteria. In some embodiments, the beam deflector can be configured to provide a deflection speed of less than one microsecond (e.g. 10 nanoseconds, 30 nanoseconds, 50 nanoseconds, 100 nanoseconds, 500 nanoseconds, etc.) and a deflection angle of greater than 0.01 degree (e.g. 0.01-1 degrees, 1-5 degrees, 5-15 degrees, 1-15 degrees, or above 15 degrees, etc.).

A controller can be connected to such a contemplated beam deflector that is configured to adjust deflection properties of the beam deflector to form the combined laser beam 9. The lasers, which may each direct laser pulses at the beam deflector at a unique incident angle, can also be controlled and synchronized so that their pulses each hit the beam deflector at a unique time so that each pulsed laser from a respective one of the lasers hits the beam deflector at a time when none of the other laser pulses from the other lasers hit the beam deflector. The controller can be configured to synchronize the timing and the incident angle at which the lasers pulses from the lasers hit the beam deflector with the deflection property adjustment of the beam deflector effected by the controller so that the laser pulses from the lasers propagate in the same direction after passing through the beam deflector.

It should be appreciated that embodiments of the laser combining apparatus 100 can have different configurations for meeting different sets of design criteria. For instance, the number of lasers used in the array of lasers, the operational parameters of those lasers, the size and shape of the deflector body of the beam deflector, and the size and shape of the aperture through which the laser beams of the lasers pass into the deflector body, and the structure and composition of the deflector beam 5 can all have selectively designed parameters to meet a particular set of design criteria. For instance, the deflector body of the beam deflector can be a shape that is not cubed (e.g. oval, convex, concave, etc.). The operational parameters and type of the lasers in the laser array may be set to meet a particular set of design criteria (e.g. cost, availability of the lasers, etc.). The size, structure, and configuration of the electric power supply and controller 7 can be any number of configurations. For instance, the number of switches, capacitors and resistors used in the electric power supply and controller 7 can be any number that may be needed to meet a particular set of design criteria (e.g. number of lasers to be used, power, pulse duration and pulse repetition rates of the lasers to be used, etc.). As yet another example, the beam deflector 5 can be configured to utilize temperature gradient, composition gradient, and/or prism shapes of a deflector body of the beam deflector to define the deflection properties of the beam deflector 5. As a further example, beam deflector 5 may employ multiple physical scanning mechanisms simultaneously including space-charge-controlled beam deflection, composition gradient controlled beam deflection, temperature gradient controlled beam deflection, the non-uniform (e.g., prism) geometric shape controlled beam deflection. For example, in terms of two-dimensional beam deflector 5, a first dimensional scanning can use a space-charge-controlled beam deflection and a second dimensional scanning can use a composition gradient or temperature gradient controlled beam scanning to provide 2D deflection. In terms of 2D TDM, the number of TDM multiplexed channels of one dimension can be different from the other dimension. As another example, a first dimensional scanning can use a composite gradient controlled beam scanning and the second dimensional scanning can use temperature gradient controlled beam scanning.

Thus, while certain present preferred embodiments of my laser combining apparatus and embodiments of methods for making and using the same have been shown and described above, it is to be distinctly understood that the invention is not limited thereto but may be otherwise variously embodied and practiced within the scope of the following claims.

I claim:

1. A laser combining apparatus comprising:
   an array of lasers, each of the lasers configured to transmit laser pulses;
   a potassium tantalate-niobate (KTN) beam deflector positioned to receive the laser pulses from the lasers of the array of lasers such that the laser pulses pass through the KTN beam deflector to form a combined laser beam; and
   an electric power supply and controller connected to the KTN beam deflector that is configured to adjust deflection properties of the KTN beam deflector,
   wherein the electric power supply and controller comprises:
      a voltage source;
      a plurality of capacitors;
      a plurality of resistors and;
      a plurality of electric switches connected to the capacitors.

2. The laser combining apparatus of claim 1, wherein the electric power supply and controller is configured to control timing of the laser pulses from the lasers of the array of lasers and is configured to adjust the deflection properties of the KTN beam deflector to synchronize timing and incident angle of the laser pulses with the deflection properties of the KTN beam deflector so that a propagation direction of the laser pulses after passing through a deflector body of the KTN beam deflector are the same regardless of an incident angle and/or incident direction at which the laser pulses hit a front surface of the deflector body of the KTN beam deflector.

3. The laser combining apparatus of claim 2, wherein the KTN beam deflector has an aperture through which the laser pulses pass for being passed into the deflector body of the KTN beam deflector.

4. The laser combining apparatus of claim 3, wherein the lasers are spaced apart from each other and each have a respective incident angle at which the laser pulses from the laser are passed into the deflector body of the KTN beam deflector.

5. The laser combining apparatus of claim 1, wherein the electric switches are arranged such that each switch is adjustable from OFF positions to ON positions so that only one switch of the switches is in an ON position at any time, each switch being assigned to a respective laser of the array of lasers so that each switch is moved to its ON position when a laser pulse from the laser assigned to that switch is to hit a front face of a deflector body of the KTN beam deflector.

6. The laser combining apparatus of claim 1, wherein the switches are arranged and configured such that the switches are moveable to ON and OFF positions for defining different voltage amounts to be fed to the KTN beam deflector, each different voltage amount being assigned to a respective one of the lasers of the array of lasers, the switches configured to be moved so that a unique voltage assigned to a respective laser of the array of lasers is fed to the KTN beam deflector when a laser pulse from that laser is to hit a front face of a deflector body of the KTN beam deflector.

7. The laser combining apparatus of claim 1, wherein the beam deflector is a KTN beam deflector that is based on space-charged-controlled beam deflection, or temperature-gradient-controlled beam deflection, or the composition-gradient-controlled beam deflection, or geometric shape-controlled beam deflection, or their combinations.

8. The laser combining apparatus of claim 1, wherein the beam deflector is a lithium niobate (LiNbO3) based beam deflector, a lead magnesium niobate-lead titanate (PMN-PT) based beam deflector, a lanthanum-modified lead zironate titanate (PLZT) based beam deflector, a barium titanate (BaTiO3) based beam deflector, or a strontium-barium niobate (SBN) based beam deflector.

9. The laser combining apparatus of claim 1, wherein the beam deflector is a microelectromechanical system (MEMS) based beam deflector, a nanoelectrormechanical system (NEMS) based beam deflector, or an acousto-optic (AO) based beam deflector.

10. A laser combining apparatus comprising:
    an array of lasers, each of the lasers configures to transmit laser pulses,
    a potassium tantalate-niobate (KTN) beam deflector positioned to receive the laser pulses from the lasers of the array of lasers such that the laser pulses pass through the KTN beam deflector to form a combined laser beam; and
    an electric power supply and controller connected to the KTN beam deflector that is configured to adjust deflection properties of the KTN beam deflector;

wherein the electric power supply and controller comprises a switchable capacitor voltage divider, the switchable capacitor voltage divider being configured to adjust between different positions, each of the positions assigned to a respective one of the lasers of the array of lasers for sending a unique voltage to the KTN beam deflector at the time a laser pulse from that laser hits a front face of the deflector body of the KTN beam deflector to adjust the deflection properties of the KTN beam deflector so that the laser pulse is passed through the deflector body to form the combined laser beam.

11. The laser combining apparatus of claim 10, wherein the unique voltage is a different voltage for each of the lasers of the array of lasers.

12. A method of combining laser pulses from different lasers for forming a combined laser beam, the method comprising:
   controlling the lasers so that each laser sends a laser pulse toward a beam deflector to hit a front face of a deflector body of the beam deflector so that all laser pulses from the lasers hit the front face at a different time, each of the lasers sending the laser pulse of that laser to the beam deflector at a different incident angle; and
   adjusting a deflection property of the beam deflector to synchronize timing and incident angle at which lasers pulses from the lasers hit the beam deflector so that the laser pulses from the lasers propagate in a same direction after passing through the beam deflector,
   wherein the adjusting of the deflection property of the beam deflector comprises adjusting positions of at least one switch of an electric power supply and controller connected to the beam deflector, wherein the electric power supply and controller comprises:
      a voltage source;
      a plurality of capacitors;
      a plurality of resistors; and
      a plurality of electric switches connected to the capacitors.

13. The method of claim 12, wherein the adjusting of the deflection property of the beam deflector comprises:
   assigning a different voltage to be fed to the beam deflector for each laser of the laser array to account for the incident angle of that laser and applying the assigned voltage to the beam deflector for the laser pulse from that laser to which the different voltage is assigned when that laser pulse hits the beam deflector.

14. The method of claim 12, wherein the switches are arranged such that each switch is adjustable from an OFF position to an ON position so that only one switch of the switches is in an ON position at any time, each switch being assigned to a respective laser of the array of lasers so that each switch is moved to its ON position when a laser pulse from the laser assigned to that switch is to hit a front face of a deflector body of the beam deflector.

15. The method of claim 12, wherein the switches are arranged and configured such that the switches are moveable between ON and OFF positions for defining different voltage amounts to be fed to the beam deflector, each different voltage amount being assigned to a respective one of the lasers of the array of lasers, the switches configured to be moved so that a unique voltage assigned to a respective laser of the array of lasers is fed to the beam deflector when a laser pulse from that laser is to hit a front face of a deflector body of the beam deflector.

16. The method of claim 12, wherein the beam deflector is a one-dimensional beam deflector or a two-dimensional beam deflector.

17. The method of claim 12, wherein the laser pulses are evenly or unevenly spaced.

18. A method combining laser pulses from different lasers for forming a combined laser beam, the method comprising:
   controlling the lasers so that each laser sends a laser pulse toward a beam deflector to hit a front face of a defector body of the beam deflector so that all laser pulses from the laser hit the front face at a different time, each of the lsers sending the laser pulse of that laser to the beam deflector at a different incident angle; and
   adjusting a deflection property of the beam deflector to synchronize timing and incident angle at which laser pulses from the lasers hit the beam deflector so that the laser pulses from the lasers propagate in a same direction after passing through the beam deflector,
   wherein the adjusting of the deflection property of the beam deflector comprises adjusting positions of at least onw switch of an electric power supply and controller connected to the beam deflector; and
   wherein the electric power supply and controller comprises a switchable capacitor voltage divider, a switchable resistant voltage divider circuit, a high voltage pulsed voltage source, an arbitrary form voltage generator, a high voltage and high speed voltage amplifier, or combinations thereof.

19. The method of claim 18, wherein the switchable capacitor voltage divider is configured to adjust between different positions, each of the positions assigned to a respective one of the lasers of the array of lasers for sending a unique voltage to the beam deflector at the time a laser pulse from that laser hits a front face of the deflector body of the beam deflector to adjust the deflection properties of the beam deflector so that the laser pulse is passed through the deflector body to form the combined laser beam.

20. The method of claim 19, wherein the unique voltage is a different voltage for each of the lasers of the array of lasers.

* * * * *